US009268550B2

(12) United States Patent
Stolberg et al.

(10) Patent No.: US 9,268,550 B2
(45) Date of Patent: Feb. 23, 2016

(54) METHOD OR IMAGE MANAGEMENT IN DISTRIBUTED CLOUD

(71) Applicant: ALCATEL-LUCENT ISRAEL LTD., Petah Tekva (IL)

(72) Inventors: Inbar Stolberg, Hod Hashron (IL); Ittay Dror, Rishon le Tsion (IL); Avi Ben-Harush, Modiin (IL); Assaf Sinvani, Modiin (IL); Elhay Efrat, Hadera (IL); Limor Bortman, Tel-Aviv (IL)

(73) Assignee: Alcatel Lucent, Boulogne-Billancourt (FR)

( * ) Notice: Subject to any disclaimer, the term of this patent is extended or adjusted under 35 U.S.C. 154(b) by 58 days.

(21) Appl. No.: 13/852,259

(22) Filed: Mar. 28, 2013

(65) Prior Publication Data

US 2014/0298323 A1    Oct. 2, 2014

(51) Int. Cl.
*G06F 9/445*    (2006.01)
(52) U.S. Cl.
CPC ........................................ *G06F 8/63* (2013.01)
(58) Field of Classification Search
CPC .......................................................... G06F 8/61
USPC .................................................. 717/168–178
See application file for complete search history.

(56) References Cited

U.S. PATENT DOCUMENTS

| 5,008,814 | A  | * | 4/1991  | Mathur ........................... | 709/221 |
| 6,138,153 | A  | * | 10/2000 | Collins et al. .................. | 709/221 |
| 6,199,204 | B1 | * | 3/2001  | Donohue ....................... | 717/178 |
| 8,239,509 | B2 | * | 8/2012  | Ferris et al. .................... | 709/223 |
| 8,601,170 | B1 | * | 12/2013 | Marr et al. ....................... | 710/8   |
| 8,706,869 | B2 | * | 4/2014  | Campion et al. ............... | 709/224 |
| 2003/0018964 | A1 | * | 1/2003 | Fox et al. ....................... | 717/177 |
| 2008/0127170 | A1 | * | 5/2008 | Goldman et al. ............. | 717/174 |
| 2011/0055823 | A1 | * | 3/2011 | Nichols et al. ................ | 717/174 |
| 2012/0079471 | A1 | * | 3/2012 | Vidal et al. .................... | 717/169 |
| 2012/0297375 | A1 | * | 11/2012| Burke, Jr. ....................... | 717/173 |
| 2014/0047440 | A1 | * | 2/2014 | Da Silva et al. ................ | 718/1   |
| 2014/0101652 | A1 | * | 4/2014 | Kamble et al. ................ | 717/171 |

OTHER PUBLICATIONS

Benson, Theophilus, et al. "CloudNaaS: a cloud networking platform for enterprise applications." Proceedings of the 2nd ACM Symposium on Cloud Computing. ACM, 2011, pp. 1-13.*

Tapia, Dante I., et al. "Cloud-IO: Cloud computing platform for the fast deployment of services over wireless sensor networks." 7th International Conference on Knowledge Management in Organizations: Service and Cloud Computing. Springer Berlin Heidelberg, 2013, pp. 493-504.*

Barrera, David, and Paul Van Oorschot. "Secure software installation on smartphones." IEEE Security & Privacy 9.3 (2011), pp. 42-48.*

(Continued)

*Primary Examiner* — Satish Rampuria

(74) *Attorney, Agent, or Firm* — Kramer & Amando, P.C.

(57) ABSTRACT

Various exemplary embodiments relate to a method of managing the distribution of images in a distributed cloud network by a network management system, including: receiving, by the network management system, a request for an image for a network node; identifying, by the network management system, an image from a plurality of images compatible with the network node; and initiating, by the network management system, installation of the image on the network node.

22 Claims, 4 Drawing Sheets

(56) References Cited

OTHER PUBLICATIONS

Wikapedia Entry for OBDC (Open Database Connectivity) Accessed: Mar. 11, 2013, pp. 1-9.

Wikapedia Entry for Simple Network Management Protocol Accessed: Mar. 11, 2013, pp. 1-11.

VSphere Installation and Setup, vSphere 5.1, pp. 1-316, Copyright 2012, www.vmware.com.

* cited by examiner

| Image id | Image type | Os type | Os bits | Os version | Customer id |
|---|---|---|---|---|---|
| 1001 | Template | Linux | 64 | 4.5 | 143 |
| 1002 | ISO | Linux | 32 | 4.1 | 712 |
| 1003 | ISO | Windows 7 | 64 | 8.0 | 894 |
| 1004 | Template | Windows XP | 32 | 2.5 | 339 |
| 1005 | ISO | MacOS | 64 | 10.8 | 402 |
| 1006 | Template | Windows 8 | 64 | 8.0 | 603 |

| Cloud node image id | Image id | Hypervisor | Size | Cloud node id | Cloud node image uuid |
|---|---|---|---|---|---|
| 2005 | 1001 | XEN | 4 | 3007 | 123-445 |
| 2006 | 1002 | KVM | 5 | 3008 | 3345-67 |
| 2007 | 1001 | XEN | 4 | 3009 | 234-678 |
| 2008 | 1003 | VMWare | 6 | 3012 | 832-920 |
| 2009 | 1004 | KVM | 3 | 3020 | 402-092 |
| 2010 | 1005 | VMWare | 4 | 3015 | 703-239 |

METHOD OR IMAGE MANAGEMENT IN DISTRIBUTED CLOUD

TECHNICAL FIELD

Various exemplary embodiments disclosed herein relate generally to a method for image management in a distributed cloud.

BACKGROUND

Deploying cloud infrastructure and software may include many customization factors that cloud customers must accommodate when on-boarding software onto the cloud. Specifically, each cloud node may be managed via specific providers, for example, CloudStack, OpenStack, etc. Further, the cloud node may use a specific hypervisor to manage the node, for example, KVM, XEN, VMWare, etc. For each combination of these properties a different software image may be required. Further, a different setup process may be required to install the image depending upon the various factors.

In the current state-of-the art, a customer that wants to deploy a given image at several cloud nodes must manage each independently. This requires manually accessing each cloud node and targeting the specific needs of each system. As a result, large applications installed on a distributed cloud may be very difficult and cumbersome to manage. Additionally, in a distributed cloud there may be considerable challenges in image distribution that arise from security limitations that may block access between certain cloud nodes and image servers.

Additional issues exist. For example, there are differences between the image registration parameters between the different providers, for example, CloudStack requires a network location identifier such an URL indicating where the image is stored while OpenStack requires an input stream. In another example, the cloud nodes might not be in the same DMZ (demilitarized zone or secure network segment) as the image server, which means that the cloud nodes might not be able to use the image URL to retrieve the image directly from the image server. Also, each cloud node might be in a different DMZ, so two cloud nodes might not have access to each other and so cannot pass the image URL from one cloud node to another.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of managing the distribution of images in a distributed cloud network by a network management system, including: receiving, by the network management system, a request for an image for a network node; identifying, by the network management system, an image from a plurality of images compatible with the network node; and initiating, by the network management system, installation of the image on the network node.

Various exemplary embodiments relate to a network management system that manages the distribution of images in a distributed cloud network, the network management system including: a data storage; a processor in communication with the data storage, the processor being configured to: receive a request for an image for a network node; identify an image from a plurality of images compatible with the network node; and initiate installation of the image on the network node.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
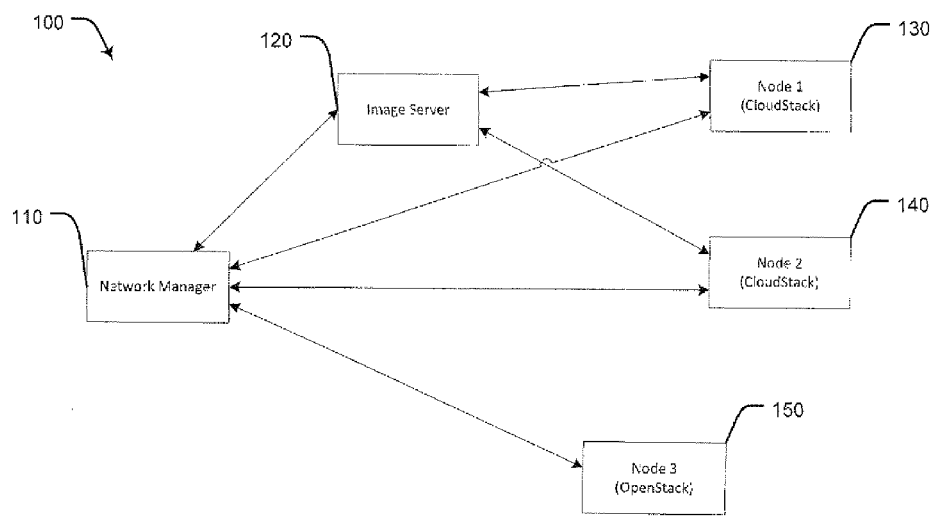
FIG. 1 illustrates an embodiment of a cloud including a network manager that installs and manages images installed on cloud nodes in the cloud.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments may be combined with one or more other embodiments to form new embodiments.

Referring now to the drawings, in which like numerals refer to like components or steps, there are disclosed broad aspects of various exemplary embodiments.

Because of the problems described above, there remains a need for a cloud manager that manages the distribution of images on to a variety of various cloud nodes that might be using different providers, hypervisors, operating systems, etc.

FIG. 1 illustrates an embodiment of a cloud including a network manager that installs and manages images installed on cloud nodes in the cloud. The cloud 100 may include a network manager 110, and image server, and cloud nodes 130, 140, 150.

The network manager 110 may provide various network management functions. The network manager 110 may specifically manage the installation of images on cloud nodes 130, 140, 150 (collectively, cloud nodes). The network manager may communicate with and manage an image server 120 where various images are stored. The network manager 110 may also store images and related information on storage located in the network manager 110 or external to the network manager 110. The network manager may send a URL indicating the location of the image to one of the cloud nodes. This URL may point to an image stored on either the network manager 110, the image server 120, or any other suitable storage communicatively connected to the cloud node. The identified one of cloud nodes may then access the image using the received URL, and install the received image. The network manager 110 may also stream the image to the cloud node 130. Whether the network manager 110 sends a URL or streams the image depends the preferences and the abilities of the particular one of cloud nodes 130, 140, 150. Other known methods may be used by the network manager 110, image server 120, and the cloud nodes 130, 140, 150 to install an image on the cloud nodes 130, 140, 150.

The network manager 110 may also obtain a needed image from a cloud node where the image is installed. In some of these embodiments, the network manager 110 obtains the needed image from a cloud node where the image is installed when the needed image is not found at the image server 120 or at the network manager 110. In this situation the needed image may be stored on the network manager 110 or the image server 120 for further installation on cloud nodes when needed.

Figure 2:
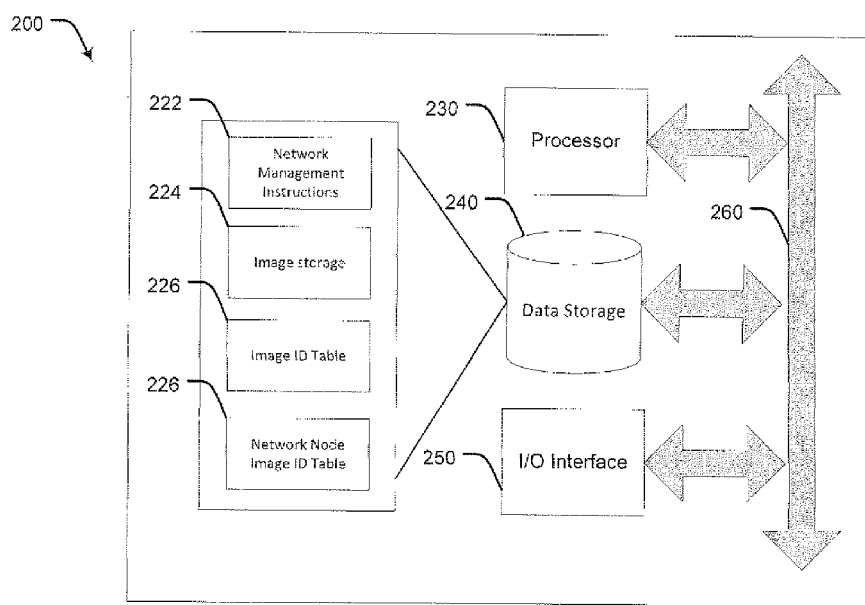
FIG. 2 illustrates an embodiment of a network manager.

FIG. 2 illustrates an embodiment of a network manager. The network manager 200 may be the same as the network manager 110. The network manager 200 may include a processor 230, data storage 240, and I/O interface 250, and an I/O communication channel 260.

The processor 230 may control the operation of the network manager 200 and cooperate with the data storage 240 and the I/O interface 250, via a system bus. As used herein, the term "processor" will be understood to encompass a variety of devices such as microprocessors, field-programmable gate arrays (FPGAs), application-specific integrated circuits (ASICs), and other similar processing devices.

The data storage 240 may store program and other data such as various programs and data useful in implementing the functions described above. For example, the data storage 240 may store network manager instructions for performing various functions carried out by the network manager. The data storage 240 may also store data images in the image storage 224. The data storage 240 may also include an image ID table 226 and a network node image ID table 228.

The I/O interface 250 may cooperate with the processor 230 to support communications over one or more communication channels. For example, the I/O interface 250 may include a user interface, such as a keyboard and monitor, or a network interface, such as one or more Ethernet ports. The I/O communication channel 260 may include various types of communication protocols and physical layers in order to manage the network.

In some embodiments, the processor 230 may include resources such as processors/CPU cores, the I/O interface 250 may include any suitable network interfaces, or the data storage 240 may include memory or storage devices such as magnetic storage, flash memory, random access memory, read only memory, or any other suitable memory or storage device. Moreover the network manager 200 may be any suitable physical hardware configuration such as: one or more server(s), blades consisting of components such as processor, memory, network interfaces or storage devices.

The image server 120 may store images for applications to be installed on cloud nodes 120, 140, 150. The image server 120 may provide images using a URL, by streaming, or other known methods. The image server 120 may provide images directly to cloud nodes 130, 140, 150 for installation or may provide images to the network manager 110 for installation to cloud nodes 130, 140, 150. Further, the image server may provide a URL that indicates the location of the image to be installed. Such URL may be provided directly to a cloud node 130, 140, 150 or to the network manager 110. The network manager 110 may then send the URL to the cloud node requesting the image. Further, the network manager 110 may store the URL for use later in satisfying a request for the image.

Figures 3, 4, 5:
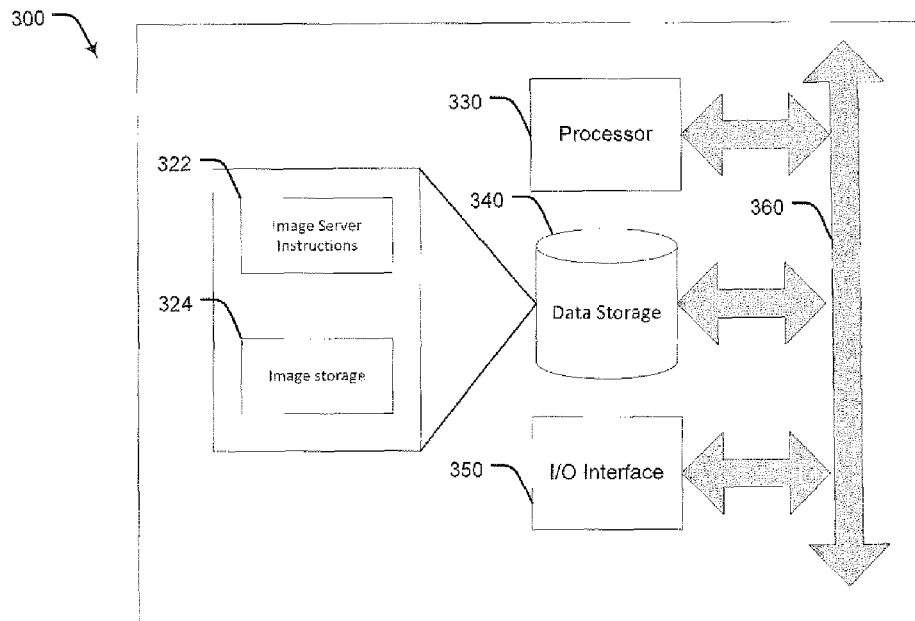
FIG. 3 illustrates an embodiment of an image server.
FIG. 4 illustrates an image ID table.
FIG. 5 illustrates a cloud node image ID table.

FIG. 3 illustrates an embodiment of an image server. The image server 300 may be the same as the image 120. The image server 300 may include a processor 330, data storage 340, and I/O interface 350, and an I/O communication channel 360.

The processor 330 may control the operation of the image server 300 and cooperate with the data storage 340 and the I/O interface 350, via a system bus. As used herein, the term "processor" will be understood to encompass a variety of devices such as microprocessors, field-programmable gate arrays (FPGAs), application-specific integrated circuits (ASICs), and other similar processing devices.

The data storage 340 may store program and other data such as various programs and data useful in implementing the functions described above. For example, the data storage 340 may store image server instructions for performing various functions carried out by the image server. The data storage 340 may also store data images in the image storage 324.

The I/O interface 350 may cooperate with the processor 330 to support communications over one or more communication channels. For example, the I/O interface 350 may include a user interface, such as a keyboard and monitor, or a network interface, such as one or more Ethernet ports. The I/O communication channel 360 may include various types of communication protocols and physical layers in order to manage the network.

In some embodiments, the processor 330 may include resources such as processors or CPU cores, the I/O interface 350 may include any suitable network interfaces, or the data storage 340 may include memory or storage devices such as magnetic storage, flash memory, random access memory, read only memory, or any other suitable memory or storage device. Moreover the network manager 300 may be any suitable physical hardware configuration such as: one or more server(s), blades consisting of components such as processor, memory, network interfaces or storage devices.

FIG. 4 illustrates an image ID table. The image ID table may include a machine-readable storage medium such as read-only memory (ROM), random-access memory (RAM), magnetic disk storage media, optical storage media, flash-memory devices, or similar storage media. Further, while a table is shown in FIG. 4 other data structures may be used to store the image ID data. Specifically, each image may have an image ID as shown in the first column. Each image may have further identifying information associated with it such as image type, OS type, OS bits, OS version, and customer ID. Other data may be included as well, and this list serves as an example of the type of date that may be stored. One additional type of information may include a rule set. This rule set may specify specific steps needed to install the image. The table in FIG. 4 shows six images each with different characteristics. An image ID table may include many more entries depending upon the specific applications available.

FIG. 5 illustrates a cloud node image ID table. The cloud node image ID table may include a machine-readable storage medium such as read-only memory (ROM), random-access memory (RAM), magnetic disk storage media, optical storage media, flash-memory devices, or similar storage media. Further, while a table is shown in FIG. 5 other data structures may be used to store the cloud node image ID data. Specifically, each cloud node image may have an cloud node image ID as shown in the first column. Each cloud node image ID may have further identifying information associated with it such as image ID, hypervisor, size, cloud node ID, and cloud node image UUID. Other data may be included as well, and this list serves as an example of the type of date that may be stored. The table in FIG. 5 shows six cloud node image IDs each associated with a cloud node having a specific image loaded thereon. An cloud node image ID table may include many more entries depending upon the specific number of cloud nodes.

When a customer requests some action to be taken for a given image, database operation may be conducted to determine for each location what the underlying infrastructure is at that location (for example, hypervisor, provider, etc.). Then the manner in which such an action is performed may be tailored to that specific infrastructure. Such action may include, for example, deployment, removal, update, etc.

The cloud manager embodiment discussed herein has the ability to support image distribution within complex network architectures. As shown in FIG. 1, there may an image server (or multiple image servers) that stores at least a portion of the images a customer may want to deploy. This image server may be maintained by a cloud provider, or by external parties authorized by the cloud provider to deploy on the provider's cloud. The basic approach for such deployment of images may be for a customer to provide an image URL, which is sent to an image server and used to retrieve the image from this server. Below different functionalities that network the manager supports to deal with complex network scenarios are discussed.

The network manger may provide the following capabilities for image distribution. First, in a first, basic configuration, the network manager may access all the cloud components. In this case the network manager may validate the URL from the image server, such as checking that it is indeed a valid URL and checking additional meta-data, and then may distribute the URL to the requesting cloud nodes, allowing each requesting cloud node to download the image.

Second, in an additional configuration, the network manager may not be able to directly access the image server, and so it cannot verify the URL as in the first configuration. In this situation, the network manager may pass on the URL to the different requesting cloud nodes without this validation, but once an image is successfully installed and registered on one of the requesting cloud nodes, the network manager may download the image from this cloud node and may use an HTTP server to distribute the images from the network node itself. Note that in this configuration, it does not matter what type of node (i.e., CloudStack or OpenStack) is used. This not only allows for the network manager to access the image directly—it may also allow access to the image for cloud nodes that do not have access to the image server(s).

Third, an additional configuration considers the case where the image did not originate from the image server but rather from one of the cloud nodes, e.g., the image was created from a machine on an OpenStack node. This may happen, for example, when the command to create the image from the machine was issued using the network manager. The network manager may download the image and then provide a link that will distribute the image to the remaining cloud nodes.

Finally, when a new node is added to the cloud, all the images may be automatically distributed to this new node using the methods described above.

Figure 6:
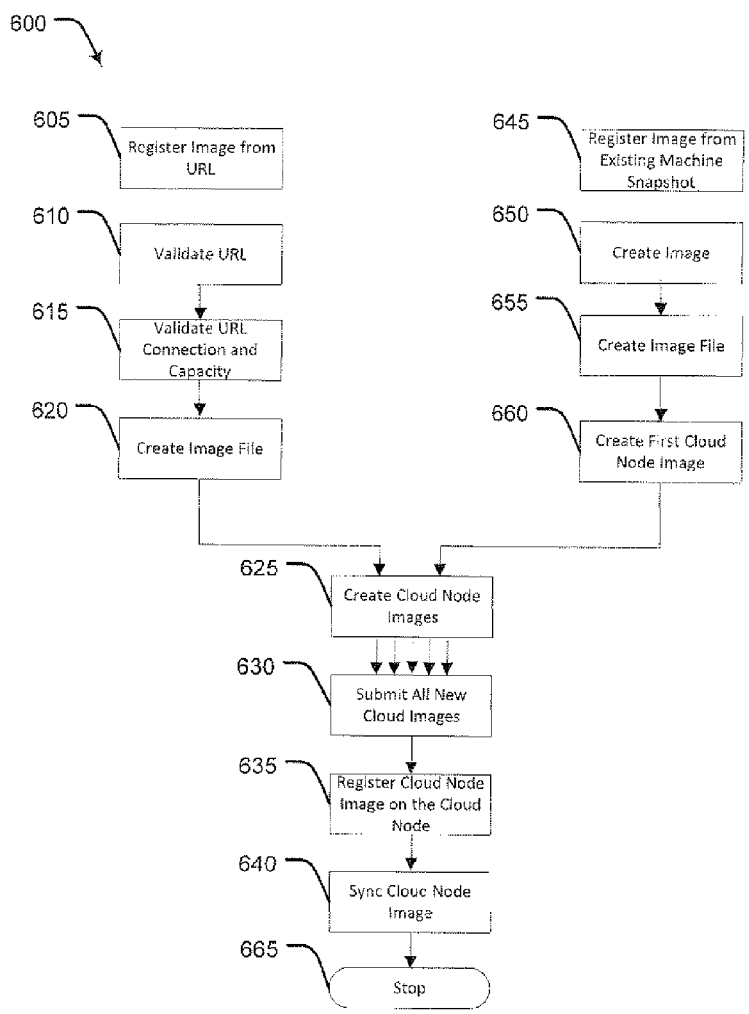
FIG. 6 illustrates methods for registering images.

FIG. 6 illustrates methods for registering images. The method 600 has two branches illustrated by 605 and 645. The first branch illustrates registering an image from a URL. At step 610, the network manager may validate the URL, which may include checking the basic protocol and port to use. Next, at step 615, the network manager may validate the URL connection and capacity. This may include checking the connection to the URL, and checking the user capacity relative to the image file size. Then the network manager may create an image file at step 620. If there is an existing image file, it may be removed and a new file created.

Next, at step 625, the network manager may create cloud node images. This may depend upon the specific hypervisor where the image is to be installed and may depend upon the specific cloud provider. Further, if there is already a cloud node image associated with this image, a cloud node image many not be created, but the existing cloud node image used. At step 630, the network manager may submit all new cloud images. The cloud node images may be submitted by sending a URL to the cloud node or streaming the cloud node image to the cloud node. Next, at step 635, the cloud node image may be registered on the cloud node. Finally, at step 640, the cloud node images may be synchronized. The method may then end at step 665.

The second branch illustrates registering an image from an existing machine snapshot 645. At step 650, an image file may be created that includes a basic container. Next, at step 655, an image file may be created. Next, at step 660, a first cloud node image may be produced. The image may be registered on the cloud node zone of the machine providing the snapshot. Next, the method 600 may proceed to step 625, and the method 600 may proceed as described above. The steps of method 600 may be performed by the network manager or other elements of the cloud network.

Figure 7:
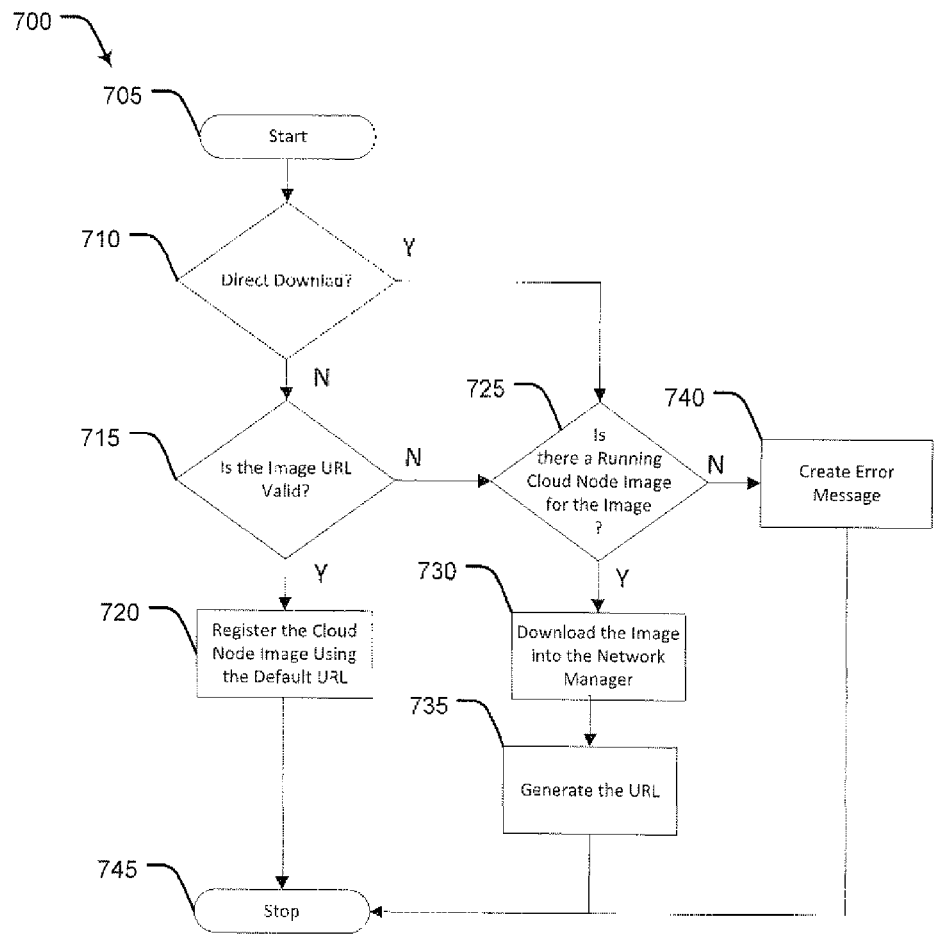
FIG. 7 illustrates a method of creating cloud mode images for distribution.

FIG. 7 illustrates a method of creating cloud mode images for distribution. This method may be carried out by the network manager or other elements of the cloud network. The method 700 may begin at 705. Next, at step 710 it is determined if the image download is a direct download. If not, then at step 715, it is determined if the image URL is valid. If the URL is valid, then at step 720, then the cloud node image is registered using the default URL. Next, the method may end at 745. If the image download is direct, then at step 725 it is determined if there is a running cloud node image for the image. If so, then at step 730, the image may be downloaded into the network manager. Next, at step 735, the URL may be generated. The method may then end at 745. If there is no running cloud node image for the image, then an error message may be generated at 740. The method may then end at 745.

In the description above of various embodiments, it is noted that various method steps are described. Such steps are described in a certain order. It is not intended that such an order is the only order possible. Therefore, other embodiments where the steps are performed in different orders are considered to be within the scope of the claims. Further, the use of the descriptors first, second, third, etc. are not intended to require that certain steps be carried out in a specific order, rather these terms are used to differentiate multiple instances of various distinct and separate elements of the same type that my appear repeatedly in the embodiments.

When processor-executable programs are implemented on a processor, the program code segments may combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

It should be apparent from the foregoing description that various exemplary embodiments of the invention may be implemented in hardware or firmware, such as for example, the distributed access gateway. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of managing the distribution of images in a distributed cloud network by a network management system comprising a processor, the method comprising:
   receiving, by the network management system, configured to manage the distribution of images in the distributed cloud network by the network management system, an image request for a cloud network node, wherein the image request specifies at least one requested image characteristic;
   identifying, by the network management system and based on the image request, an image compatible with the cloud network node from a plurality of images having the at least one requested image characteristic;
   determining that the identified image is installed on a second cloud network node;
   initiating, by the network management system, installation of the image on the cloud network node from the second cloud network node onto the cloud network node;
   validating an URL by the network management system, checking that the URL is a valid URL and checking meta-data; and
   distributing the URL to the image requesting cloud network nodes, allowing each image requesting cloud network node to download the image.

2. The method of claim 1, wherein the plurality of images are stored on an image storage device.

3. The method of claim 2, wherein the image storage device is an image server.

4. The method of claim 2, wherein the image storage device includes an image identifier (ID) table.

5. The method of claim 4, wherein the image storage device includes a cloud node image ID table.

6. The method of claim 2, further comprising:
   determining that the identified image is not available for retrieval from the image storage device.

7. The method of claim 6, further comprises storing the identified image from the second cloud network node on the image storage device.

8. The method of claim 1, wherein the plurality of images are stored on the network management system.

9. The method of claim 1, wherein initiating installation of the image includes sending to the cloud network node a network location identifier to the location of the image.

10. The method of claim 1, wherein initiating installation of the image includes streaming the image to the cloud network node.

11. The method of claim 1, wherein the at least one requested image characteristic is an operating system type; and
   wherein the plurality of images are stored with an associated image identifier (ID) table on an image server.

12. A network management system that manages the distribution of images in a distributed cloud network, the network management system comprising:
   a data storage;
   a processor to manage the distribution of images in the distributed cloud network by the network management system in communication with the data storage, the processor being configured to:
   receive an image request for a cloud network node, wherein the image request specifies at least one requested image characteristic;
   identify, based on the image request, an image compatible with the cloud network node from a plurality of images having the at least one requested image characteristic;
   determine that the identified image is installed on a second cloud network node;
   initiate installation of the image on the network node from the second cloud network node onto the cloud network node;
   validate an URL by the network management system, checking the URL is a valid URL and checking meta-data; and
   distribute the URL to the image requesting cloud network nodes, allowing each image requesting cloud network node to download the image.

13. The network management system of claim 12, wherein the plurality of images are stored on an image storage device.

14. The network management system of claim 13, wherein the image storage device is an image server.

15. The network management system of claim 13, wherein the image storage device includes an image identifier (ID) table.

16. The network management system of claim 15, wherein the image storage device includes a cloud node image ID table.

17. The network management system of claim 13, wherein the processor is further configured to:
   determine that the identified image is not available for retrieval from the image storage device.

18. The network management system of claim 17, wherein the processor is further configured to store the identified image from the second cloud network node on the image storage device.

19. The network management system of claim 12, wherein the plurality of images are stored on the network management system.

20. The network management system of claim 12, wherein initiating installation of the image includes sending to the cloud network node a network location identifier to the location of the image.

21. The network management system of claim 12, wherein initiating installation of the image includes streaming the image to the cloud network node.

22. The network management system of claim 12, wherein the at least one requested image characteristic is an operating system type; and
   wherein the plurality of images are stored with an associated image identifier (ID) table on an image server.

* * * * *